(No Model.) 2 Sheets—Sheet 1.
C. GILLMANN.
STREET SWEEPING MACHINE.
No. 412,336. Patented Oct. 8, 1889.
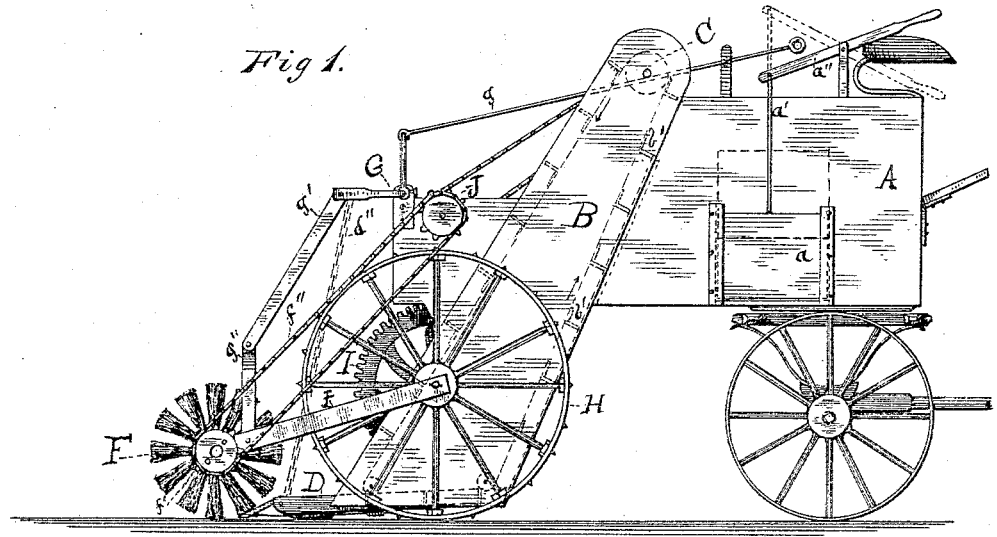
Fig 1.
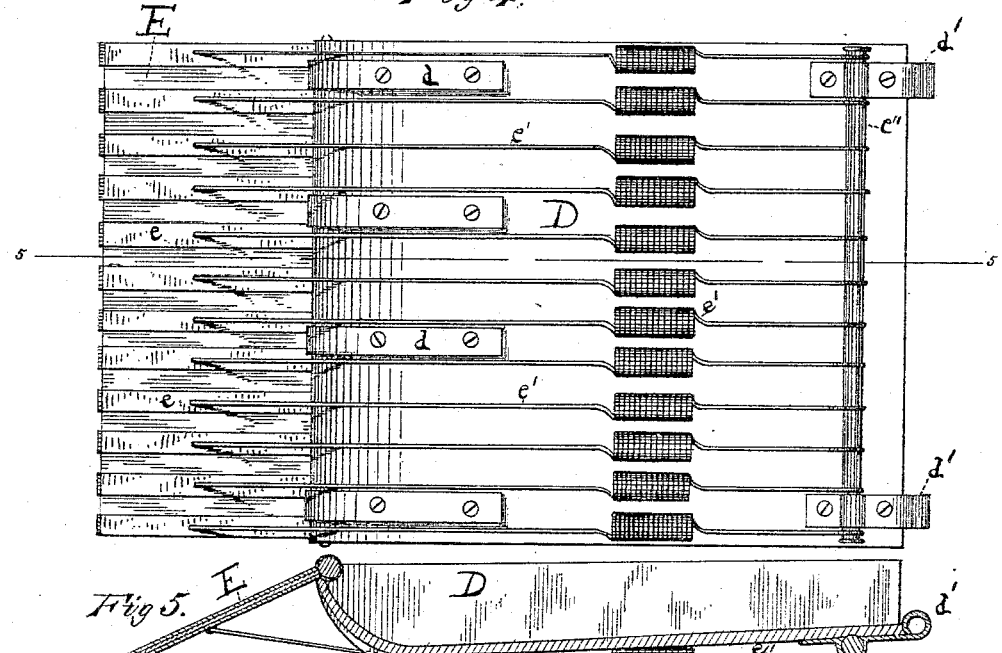
Fig 4.
Fig 5.
WITNESSES
Harman P. Kuehn
Henry W. Gilbert
INVENTOR:
Charles Gillmann
By Frank Uhing
Attorney (No Model.) 2 Sheets—Sheet 2.

C. GILLMANN.
STREET SWEEPING MACHINE.

No. 412,336. Patented Oct. 8, 1889.

WITNESSES:
Harry King
H. P. Sherlin

INVENTOR:
Charles Gillmann
By Irving Ulrich
Attorney

UNITED STATES PATENT OFFICE.

CHARLES GILLMANN, OF EAST PARK, NEW YORK.

STREET-SWEEPING MACHINE.

SPECIFICATION forming part of Letters Patent No. 412,336, dated October 8, 1889.

Application filed January 15, 1889. Serial No. 296,441. (No model.)

*To all whom it may concern:*

Be it known that I, CHARLES GILLMANN, a citizen of the United States, residing at East Park, in the county of Dutchess and State of New York, have invented certain new and useful Improvements in Street-Sweeping Machines; and I do hereby declare the following to be a full, clear, and exact description of the invention, such as will enable others skilled in the art to which it appertains to make and use the same.

My invention relates to street-sweeping machines in which a rotary revolving brush at the rear of the machine throws the dirt over a pliable rubber finger-apron into a dirt-pan, from which the dirt is elevated into a storage-box at the front of the machine by means of a series of scrapers attached to an endless belt and working close to an incline leading from the dirt-pan to the storage-box; and the objects of my invention are to provide a more easily operated and effective machine than has hitherto been in use, and to provide a finger-apron which will better adapt itself to any unevenness in the street or its rounding surface. I attain these objects by the mechanism illustrated in the accompanying drawings, in which—

Figure 2:
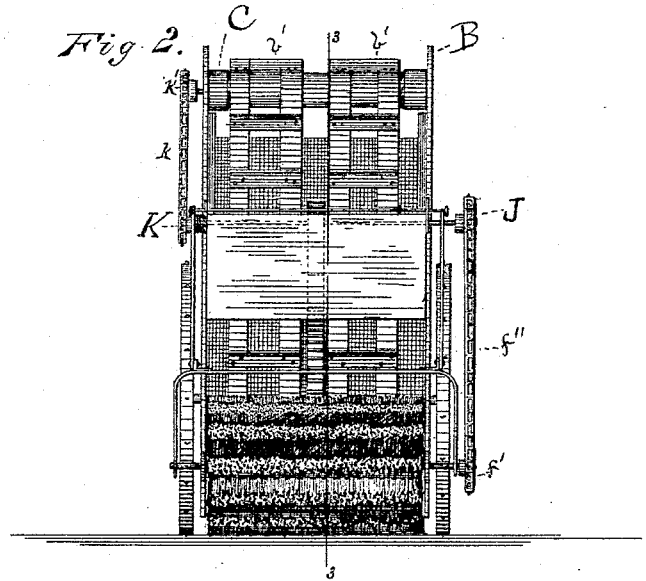
Figure 3:
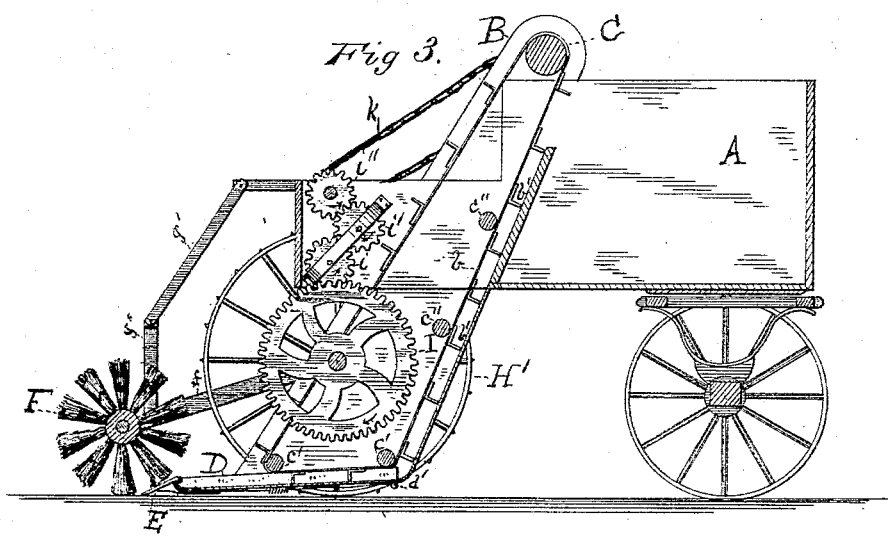

Figure 1 is a side elevation showing the whole of my street-sweeping machine in readiness for use. Fig. 2 is a rear elevation of the same, showing the revolving brush, the back of the box containing the bearings of the cog drive-gearing, and the double carrying mechanism, consisting of endless belts on either side of the cogs. Fig. 3 is a longitudinal section cut through line 3 3 of Fig. 2, better showing the operation of the brush, apron, pan, the cog-gearing, and the dirt-elevating belts. Fig. 4 is an enlarged plan view of the bottom of the dirt-pan and the flexible finger-apron, showing the springs attached to the metal fingers of the rubber apron and the steel shoes on the bottom of the pan; and Fig. 5 is an enlarged longitudinal section cut through line 5 5 of Fig. 4, showing the position of the apron and dirt-pan, which is attached to the dirt-elevator, so as to move free in meeting obstructions on the pavements.

Similar letters refer to similar parts throughout the views.

A represents the box into which the dirt is elevated, and $a$ the door for convenient unloading of the accumulated dirt. This door $a$ may be raised or lowered conveniently from the driver's seat by arms $a'$ $a''$, arranged as shown in Fig. 1.

B represents the dirt-elevator, and $b$ the endless belt, to which the dirt-carriers $b'$ are attached at intervals.

C is the main upper roller, over which the belt $b$ passes, and $c'$ $c'$ the lower guide-rollers to keep the carriers against the bottom of the dirt-pan.

$c''$ $c''$ are supplementary rollers (shown in Fig. 3) for the purpose of pressing the belt and its metal carriers in place against the inclined surface of the elevator B.

D is the dirt-pan, on the bottom of which are steel shoes $d$ to take the wear against the pavements. This dirt-pan is pivoted at $d'$ to the lower part of the elevator B, so as to move freely over obstructions, the height of $d'$ being about eight inches above the pavement in a working-machine. At the back of the dirt-pan, and attached to it so as to move freely, is a finger-apron E, made of flexible rubber, stiffened by metal fingers $e$, which are held to the pavements closely by the springs $e'$, fastened to the rod $e''$. These fingers of metal serve to protect the apron from undue wear, and also to adapt it readily to the uneven or rounding surfaces of the pavements, so that no dirt can be thrown forward underneath it. Just back of the finger-apron E is the revolving brush F, whose axle is pivoted to the arms $f f$, which in turn are pivoted to the outer ends of the main hind axle. This, it will be seen, admits of the use of a revolving brush as wide as the wheels of the machine.

At one end of the axle of the revolving brush F is a sprocket-wheel $f'$, which, by means of the chain $f''$, imparts the power to the brush from the driving-gearing, which will be more fully described.

The bell-crank lever G, operated from the driver's seat by the rod $g$ and attached to the arm $f$ of the brush F by the rods $g'$ $g''$, and also attached to the dirt-pan by the chain $d''$, furnishes convenient means of raising both brush and dirt-pan above the pavement in turning the vehicle or in the event of desiring to discontinue the sweeping for any reason whatever.

The machine rests upon only four wheels, the forward ones being in no way different from an ordinary pair of fore wheels. Of the hind wheels, one, as H, is fast to the axle and is sufficient to impart the necessary driving-power. If necessary to obtain driving-power from both wheels, a ratchet may be adjusted to catch the loose wheel until it is desired to have it work free for turning the machine.

Fast to the axle of the wheels H H' is the large cog-wheel I, which by the intermediate cog-wheels $i$ $i'$ imparts the driving-power to the cog-wheel $i''$. The latter is fast to the rod or axle, which at either end bears the sprocket-wheels J and K. J imparts the driving-power by chain $f''$, as before described, to the brush F, and K by a similar chain $k$, running over the sprocket-wheel K', which is fast on the axle of the main belt-roller C. The drawing of the machine by the horses will therefore cause both the brush and the dirt-elevating carriers to move in the same direction, as shown by the arrows in Fig. 1. In a large machine the central location of the cog-wheels and the division of the dirt-carriers and belts is perhaps the more desirable method.

It will be seen that my machine, by its low dirt-pan and flexible finger-apron directly in front of the revolving brush, avoids the necessity of any second brush or other appliance for conveying the dirt into the pan. The flexible finger-apron and the free-moving dirt-pan, while readily passing over stones and small obstructions without care on the part of the driver, are yet so close to the pavement that the dirt swept up by the revolving brush is always thrown on top of the apron and into the dirt-pan, where the scrapers attached to the revolving belt at once start it forward on the way to the storage-box. This storage-box may be made low, so that the door $a$ may be near the ground between the front and hind wheels when it is desired to take the machine to the dump, or the dirt-box may be high, as shown in the drawings, when it is desired, as is usually more convenient, to unload the dirt into an ordinary cart, which may be backed up to the door $a$ to receive its load.

I am aware that prior to my invention street-sweeping machines have been made with revolving belts for elevating dirt. I therefore do not claim such a machine, broadly; but What I do claim as my invention, and desire to secure by Letters Patent, is—

1. In a street-sweeping machine, the combination of a hinged dirt-pan, a finger-apron hinged to said pan and consisting of a series of ribs or fingers and an apron stretched across and connecting the same, a series of spiral springs equal in number to said ribs or fingers, their outer ends being connected thereto, respectively, a rod journaled on the under side of said dirt-pan and to which said springs are attached, and shoes fastened to the pan and situated between the springs, substantially as described.

2. In a street-sweeping machine, the combination of a storage-box, an elevator having an endless belt running over a pair of guide-rollers parallel with the floor of the elevator, a dirt-pan pivoted to said elevator, a revolving brush pivoted to the main driving-axle, a cog-wheel keyed to said axle and actuating a shaft journaled above the same, a pair of sprocket-chains passing around said shaft and actuating said brush and said endless elevator-belt, respectively, and mechanism, substantially as described, for elevating said brush and said dirt-pan simultaneously, in the manner and for the purpose set forth.

In testimony whereof I affix my signature in presence of two witnesses.

CHARLES GILLMANN.

Witnesses:
  HENRY W. GILBERT,
  IRVING ELTING.